(12) United States Patent
Larsen

(10) Patent No.: US 10,007,265 B1
(45) Date of Patent: Jun. 26, 2018

(54) HOSTILE TAKEOVER AVOIDANCE OF UNMANNED VEHICLES

(71) Applicant: Amazon Technologies, Inc., Seattle, WA (US)

(72) Inventor: Glen C. Larsen, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/239,570

(22) Filed: Aug. 17, 2016

(51) Int. Cl.
*B64C 39/02* (2006.01)
*G05D 1/00* (2006.01)
*G05D 1/04* (2006.01)
*B64D 45/00* (2006.01)
*G08G 5/00* (2006.01)

(52) U.S. Cl.
CPC ......... *G05D 1/0088* (2013.01); *B64C 39/024* (2013.01); *B64D 45/00* (2013.01); *G05D 1/042* (2013.01); *B64C 2201/141* (2013.01)

(58) Field of Classification Search
CPC ...... B64C 39/02; B64D 45/00; G08G 5/0086; G05D 1/0088; G05D 1/042; G07C 5/00
USPC .......................................................... 701/11
See application file for complete search history.

(56) References Cited

U.S. PATENT DOCUMENTS

2015/0314870 A1* 11/2015 Davies ................... G05D 1/102
  701/3
2016/0321503 A1* 11/2016 Zhou .................. G06K 9/00637
2017/0235316 A1* 8/2017 Shattil .................... G05D 1/104
  701/3

* cited by examiner

*Primary Examiner* — Tan Q Nguyen
(74) *Attorney, Agent, or Firm* — Kilpatrick Townsend & Stockton LLP

(57) ABSTRACT

A method and system for detecting and recovering from hostile takeovers of aerial vehicles is described. In some examples, this can include receiving, at an aerial device at a first time, a first signal expected according to a communication scheme. It can be determined that a second signal was not received at a second time based at least in part on the communication scheme. In response, an alarm signal can be generated.

20 Claims, 10 Drawing Sheets

HOSTILE TAKEOVER AVOIDANCE OF UNMANNED VEHICLES

BACKGROUND

The use of unmanned aerial vehicles (UAVs) for personal and commercial use continues to grow. Some UAVs may be controlled by a human operator with a remote control. Other UAVs may include control software, which is some cases, may enable these UAVs to operate autonomously or semi-autonomously. As the use of UAVs continues to increase, so does the likelihood of hostility towards UAVs. Such hostility may come in the form of attacks brought for any number of purposes (e.g., steal the UAVs and their payloads, crash the UAVs, and otherwise cause disruption to the operation of the UAVs). Using these attacks, nefarious individuals and/or systems may be able to obtain control of the UAVs by hacking the communication signals being sent to the UAVs from a controller and/or being sent by the UAV to the controller. Such attacks could cause the UAVs to operate unsafely and could also result in considerable financial loss for their operators.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present description are directed to, among other things, techniques relating to detecting and recovering from hostile takeovers of UAVs. In particular, the techniques described herein relate to detecting when a takeover attempt of a UAV is happening and/or has happened. This may be achieved by the UAV periodically detecting a known signal expected to be received according to a fixed interval and/or according to some other communication scheme. Under normal operating conditions, the known signal will be received by the UAV according to the fixed interval and/or the communication scheme and, in some cases, the UAV will also generate a response signal in response to receiving the known signal. Thus, so long as the UAV is receiving the known signal, and in some cases, sending the response signal, it is assumed that the UAV is operating appropriately (e.g., has not been compromised). If the known signal is interrupted, e.g., it is not received according to the fixed interval or according to the communication scheme, however, it may be inferred that a hostile takeover is occurring or has occurred. To respond to the hostile takeover, an alarm signal can be generated which causes the UAV to perform any one of a number of actions. These actions can be designed to regain control over the UAV or otherwise land the UAV at a safe location.

Turning now to a particular example, in this example, a UAV includes two modes—a mission mode and a safety mode. During normal operating conditions, the UAV operates in the mission mode. In the mission mode, the UAV receives a heartbeat signal from a controller. The heartbeat signal, which is different from a control signal that controls operation of the UAV, is sent to the UAV according to a fixed interval (e.g., every few seconds). The UAV also includes a timer that is reset each time the heartbeat signal is received. So long as the heartbeat signal is continuously received from the controller, the UAV will remain in the mission mode. However, if the timer expires without the UAV having received a new heartbeat signal (e.g., because the UAV has been hacked so the heartbeat signal cannot be received), the UAV changes from the mission mode to the safety mode. In the safety mode, the UAV performs one or more preprogrammed actions designed to reestablish communication with the controller, regain control over the UAV in the event of a hostile takeover, and/or land the UAV at a safe location.

Figure 1:
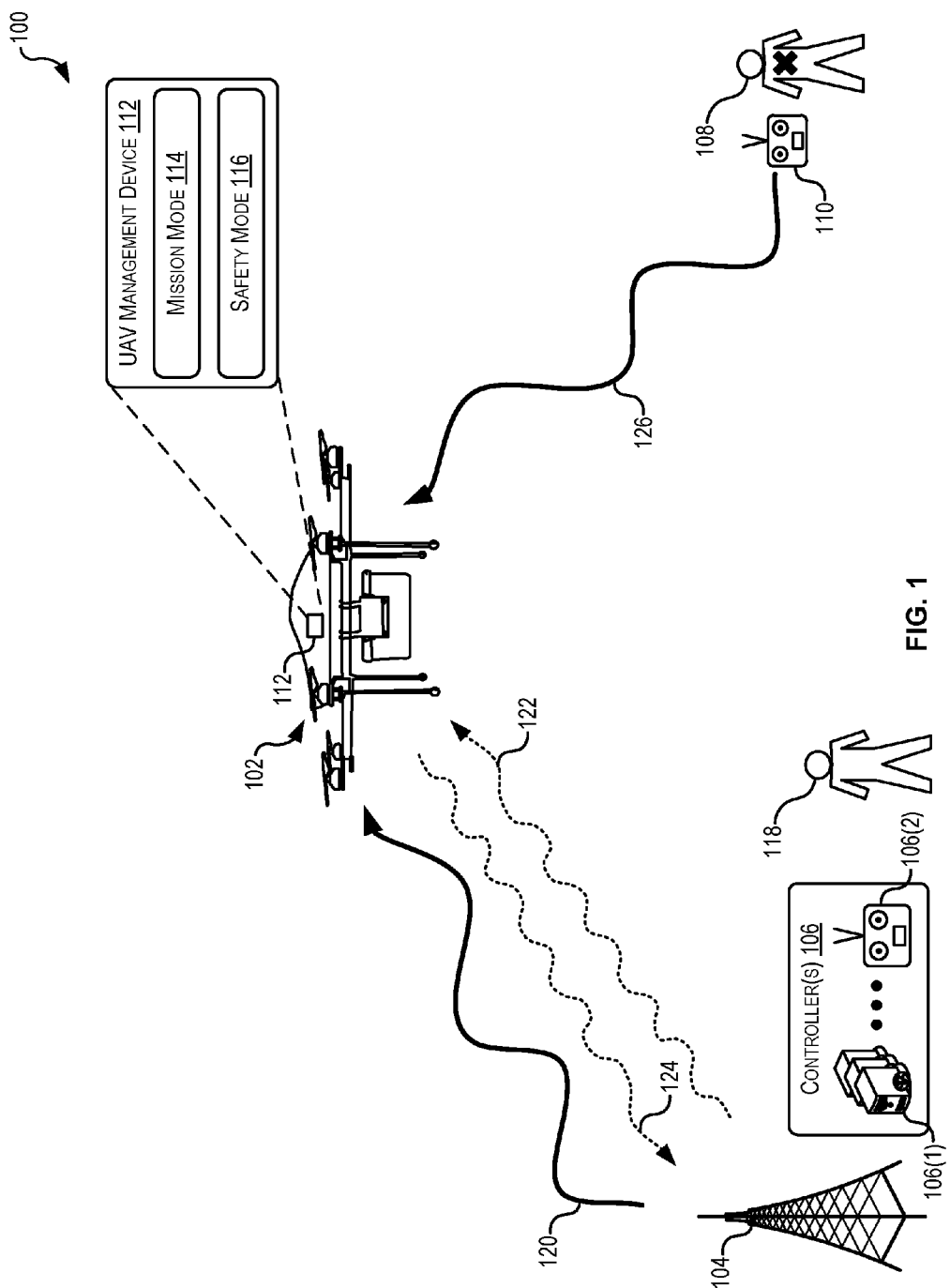
FIG. 1 is an example environment for implementing techniques relating to detecting and recovering from hostile takeovers of UAVs as described herein, according to at least one example.

Turning now to the figures, FIG. 1 illustrates an example environment 100 for implementing techniques relating to detecting and recovering from hostile takeovers of UAVs, according to at least one example. The environment 100 includes a UAV 102, a radio tower 104, controllers 106, a nefarious operator 108, and a nefarious controller 110. As described herein, the UAV 102 includes a UAV management device 112 which can include any suitable hardware and/or software to implement at least a mission mode 114 and a safety mode 116.

The controllers 106 can include any suitable type of device capable of controlling the UAV 102. For example, the controller 106(1) is an example of an aerial vehicle management system which is configured to manage the operation of a plurality of UAVs 102. This can include providing mission plans to UAVs 102 (e.g., as part of the mission mode 114) and allowing the UAVs 102 to operate autonomously or semi-autonomously. In some examples, the mission plans can include sets of instructions for the UAV 102 to follow in order to complete one or more tasks. For example, a delivery mission plan may include navigation instructions for the UAV 102 to navigate to (and from) a delivery location and delivery instructions for the UAV 102 to deliver an item at the delivery location. The aerial vehicle management system 106(1) functions as a base station for the UAV 102.

The controller 106(2) is an example of a manual control device which enables an operator 118 to manually control the UAV 102. Examples of the manual control device 106(2) may include, but are not limited to, handheld radio remote controllers, desktop remote controllers, and the like.

In some examples, the controllers 106 may use the antennas of the radio tower 104 (or any suitable combination of radio towers 104) to communicate with the UAV 102. In some examples, the controllers 106 may have their own antennas in order to communicate with the UAV 102. Such communication, in some examples, may be ongoing or may otherwise be periodic or conditional.

In some examples, to control the UAV 102, the controller 106 may provide a set of control signals 120. The set of control signals 120 may be received by the UAV 102 and used by the UAV 102 to adjust different control parameters. For example, the set of control signals 120 may cause the UAV 102 to adjust its speed, yaw, pitch, roll, payload, lights, sensors, and the like. The controller 106 may also provide a set of heartbeat signals 122 to the UAV 102. Similarly, the UAV 102 may be configured to provide a set of response signals 124 to the controllers 106. In some examples, the signals described herein (e.g., the set of control signals 120, the set of heartbeat signals 122, and the set of response signals 124) may include bundles of information provided by a signal source as a continuous transmission or as a series of discrete packages. For example, in some examples, the set of control signals 120 may include a continuous transmission to the UAV 102 that includes a continuous stream of control information. In other examples, the set of control signals 120 may include a series of discrete packages each including a portion of control information that is transmitted to the UAV 102. In some examples, the signals described herein (e.g., the set of control signals 120, the set of heartbeat signals 122, and the set of response signals 124) may be processed in any suitable manner. For example, the set of control signals 120 and the set of heartbeat signals 122 may be multiplexed into a single signal provided to the UAV 102. In this example, the UAV 102 may be programmed to identify information associated with the set of control signals 102 from information associated with the set of heartbeat signals 122.

In some examples, the signals described herein (e.g., the set of control signals 120, the set of heartbeat signals 122, and the set of response signals 124) may be provided according to any suitable communication scheme including, for example, a fixed time interval (e.g., signals or information from signals received according to a fixed time interval such as every few seconds), a rotating time interval (e.g., signals or information from signals received according to an interval that rotates through a series of times such as one second, two seconds, three seconds, and back to one second), or any other suitable interval and/or scheme according to which the signals may be provided. For example, the heartbeat signals 122 may be provided according to some fixed interval. The UAV 102 (e.g., the UAV management device 112) may be programed to receive the heartbeat signals 122 according to the fixed interval. For example, the heartbeat signals 122 may be provided to the UAV 102 every few seconds. Once the UAV 102 receives a first heartbeat signal, it can reset an onboard timer for three seconds. If the UAV 102 receives a second heartbeat signal before the timer expires (e.g., within 3 seconds), the UAV 102 may reset the onboard timer again. If the UAV 102 does not receive the second heartbeat signal before the timer expires (e.g., outside of the 3 second window), the UAV 102 may generate an alarm signal which may cause the UAV 102 to switch to the safety mode 116, as described herein. While in the safety mode 116, the UAV 102 may perform one or more actions to restore conditions whereby the heartbeat signals 122 are received again. In some examples, the heartbeat signal 122 may be interrupted (e.g., not received, received having altered characteristics, or poorly received) as a result of the nefarious operator 108 sending nefarious control signals 126 in an attempt to override the control signals 120.

The response signals 124 may be provided according to the same fixed interval as the heartbeat signals 122. The controller 106 may be programmed to receive the response signals 124 according to the fixed interval. In some examples, the response signals 124 are provided according to a different interval. Receiving the response signals 124 from the UAV 102 may inform the controller 106 that the UAV 102 is operating in an expected manner. Not receiving the response signals 124 from the UAV 102, may inform the controller 106 that the UAV 102 is not operating in an expected manner. For example, just as the heartbeat signal 122, when not received by the UAV 102, informs the UAV 102 that there may be a problem with its communication system, the response signal 124, when not received by the controller 106, informs the controller 106 that there may be a problem with the communication system of the UAV 102. For example, the response signal 124 may be interrupted (e.g., not received, received having altered characteristics, or poorly received) as a result of the nefarious operator 108 sending nefarious control signals 126 in an attempt to override the control signals 120.

When in the mission mode 114, the UAV 102 may be operable by one of the controllers 106 or otherwise to accomplish a predefined mission. For example, a predefined mission, which may be uploaded to the UAV 102, may define a navigation course for the UAV 102 and one or more tasks for completion while on the navigation course. When in the mission mode 114, the UAV 102 may also be operable by one of the controllers 106 for free flight (e.g., flight that is not tied to a predefined mission).

While in the mission mode 114, the nefarious operator 108 may use the nefarious controller 110 (and/or other electronic devices) to attempt to take over control of the UAV 102. This can include sending nefarious control signals 126 to override other control signals coming from the controller 106, hacking aspects of the management software running on the UAV 102 to gain control over components of the UAV 102, and performing other take-over techniques. In some examples, once these attempts take place and/or are successful, the UAV 102 may detect that its being controlled by the nefarious controller 110. This may be performed automatically in response to changes in expected conditions caused by the nefarious control signals 126 and/or the absence of other control signals. When the conditions are met, the UAV 102 may be changed from the mission mode 114 to the safety mode 116.

When in the safety mode 116, the UAV 102 may execute a particular set of instructions irrespective of the type of flight occurring during the mission mode 114. In this manner, the safety mode 116 may act as an override to the mission mode 114 or, in the case of a hostile takeover by the nefarious operator 108, the safety mode 116 may act as an override to controls being received from the nefarious controller 110. Thus, the safety mode 116 may be postponed so long as certain conditions relating to the UAV 102 are present or absent, depending on the implementation. When the conditions are met (e.g., after a heartbeat signal is lost, after a response signal is lost, or otherwise), however, the safety mode 116 may be invoked. Once invoked, a set of safety actions may be performed by the UAV 102. Evaluation of the conditions may be performed by the UAV 102, the controller 106, and/or any suitable combination of the UAV 102 and the controller 106. The actions performed in the safety mode 116 may function to reset components of the UAV 102 that may have been taken over by the nefarious operator 108. For example, certain actions may require the UAV 102 to re-authenticate itself at an authentication location. Such authentication may result in the UAV 102 switching back to the mission mode 114. In order to minimize future similar take-over attempts, when the UAV 102 switches back to the mission mode 114, characteristics of the control signals 120 may be altered. For example, the control signals 120 may be transmitted over a different channel, on a different frequency, using a different encryption protocol, using different encryption keys, and the like.

Figure 2:
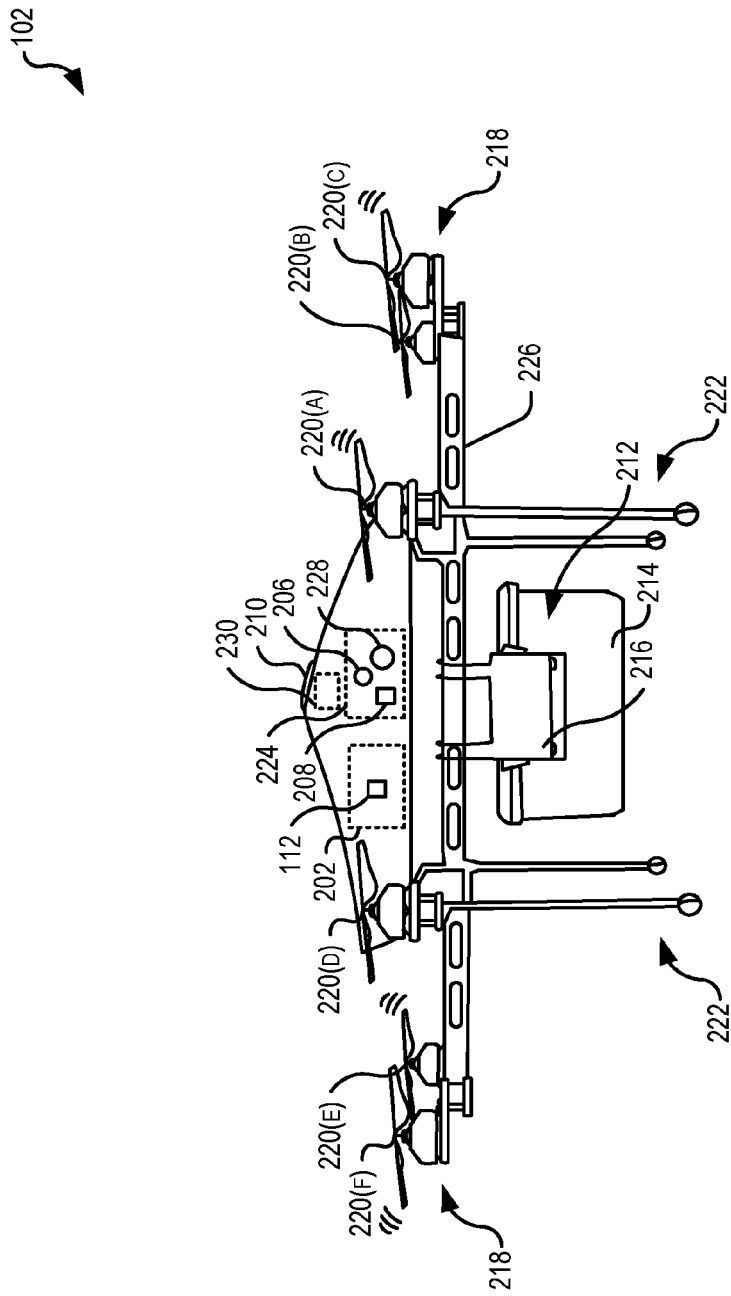
FIG. 2 is an example UAV for implementing techniques relating to detecting and recovering from hostile takeovers of UAVs as described herein, according to at least one example.

FIG. 2 illustrates the UAV 102 for implementing techniques relating to detecting and recovering from hostile takeovers of UAVs, according to at least one example. The UAV 102 may be designed in accordance with commercial aviation standards and may include multiple redundancies to ensure reliability. For purposes of this specification, the UAV 102 may include a plurality of systems or subsystems operating under the control of, or at least partly under the control of, a management system 202. The management system 202 may include the UAV management device 112 (e.g., an onboard computer) for autonomously or semi-autonomously controlling and managing the UAV 102 and, in some examples, for enabling remote control by a pilot (e.g., the operator 118). The UAV management device 112 will be discussed in more detail with reference to FIG. 3. Portions of the management system 202, including the UAV management device 112, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 102 and detecting objects) (not shown), radio-frequency identification (RFID) capability (not shown), and interfaces capable of speech interpretation and recognition (not shown).

The UAV 102 may also include a communication system 224 housed within the top cover 210. The communication system 224 may include one or more light sensors 228 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). The management system 202 may be configured to receive information and provide information via components of the communication system 224. For example, the UAV 102 may support two-way communication with operators. Two-way communication may be beneficial for verifying operators' identities that interact with the UAV 102, for posing questions to operators, and for providing instructions to operators. In some examples, the communication system 224 may operate semi-autonomously or autonomously.

As shown in FIG. 2, the UAV 102 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The UAV management device 112 may be configured to control at least a portion of the retaining system 212. In some examples, the retaining system 212 may be configured to release the payload 214 in one of a variety of ways. For example, the retaining system 212 (or other system of the UAV 102) may be configured to release the payload 214 with a winch and spool system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient using the techniques described herein. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the UAV 102 above the ground. The UAV 102 may also deliver the payload 214 by fully landing on the ground and releasing the retaining system 212.

Further, the UAV 102 may a include propulsion system 218. In some examples, the propulsion system 218 may include rotary blades or otherwise be a propeller-based system. As illustrated in FIG. 2, the propulsion system 218 may include a plurality of propulsion devices, a few of which, 220(A)-220(F), are shown in this view. Each propulsion device may include one or more propellers, a motor, wiring, a balance system, a control mechanism, and other features to enable flight. In some examples, the propulsion system 218 may operate at least partially under the control of the UAV management device 112. In some examples, the propulsion system 218 may be configured to adjust itself without receiving instructions from the UAV management device 112. Thus, the propulsion system 218 may operate semi-autonomously or autonomously. The propulsion system 218 may enable multi-directional flight of the UAV 102 (e.g., by adjusting each propulsion device individually).

The UAV 102 may also include a landing structure 222. The landing structure 222 may be adequately rigid to support the UAV 102 and the payload 214. The landing structure 222 may include a plurality of elongated legs which may enable the UAV 102 to land on and take off from a variety of different surfaces. The plurality of systems, subsystems, and structures of the UAV 102 may be connected via frame 226. The frame 226 may be constructed of a rigid material and be capable of receiving, via different connections, the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

The UAV 102 may also include a deployable slowing device 230. The deployable slowing device 230 may include any suitable device capable of slowing down the descent of the UAV 102 when deployed. For example, the deployable slowing device 230 may include a streamer, a parachute, or other comparable structure coupled to a deploying means. The deploying means may be electrically actuated, mechanically actuated, and/or actuated in any other suitable manner. In some examples, the UAV 102 may include more than one deployable slowing device 230. For example, a plurality of such devices 230 may be deployed about the perimeter of the UAV 102 (e.g., at each of the propulsion devices 220). In some examples, the deployable slowing device 230 may be deployed when the UAV 102 switches from mission mode to safety mode. In some examples, deploying the deployable slowing device 230 is just one of a plurality of safety actions that may be performed in response to detection of a hostile takeover attempt.

Figure 3:
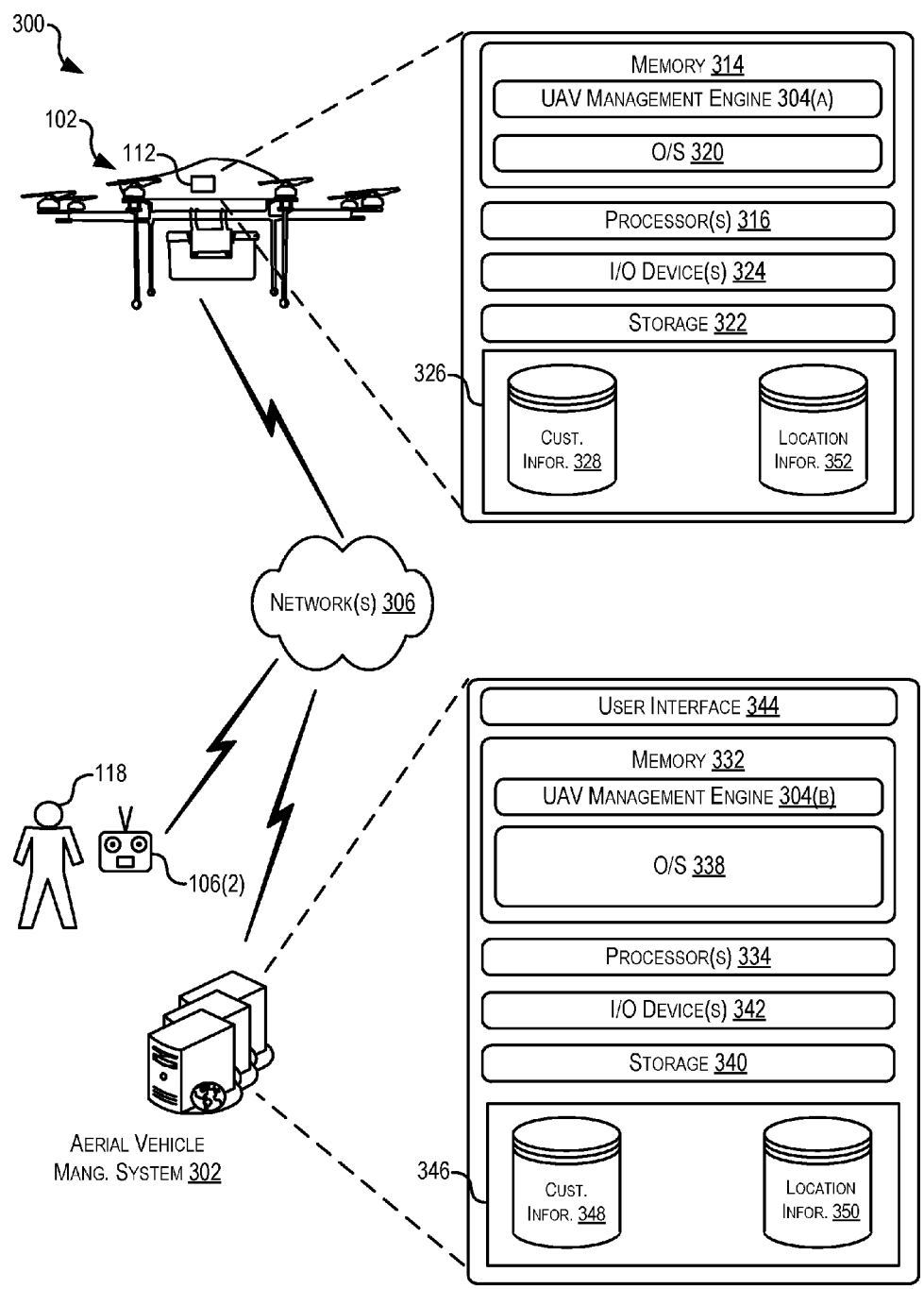
FIG. 3 is an example schematic architecture and devices for implementing techniques relating to detecting and recovering from hostile takeovers of UAVs as described herein, according to at least one example.

FIG. 3 illustrates an example schematic architecture 300 for implementing techniques relating to detecting and recovering from hostile takeovers of UAVs, according to at least one example. The architecture 300 may include an aerial vehicle management system 302, which is an example of the controller 106(1), the UAV 102, and the controller 106(2). As discussed with reference to FIG. 1, the operator 118 may use the controller 106(2) to control the UAV 102.

The aerial vehicle management system 302 may be included as part of an electronic marketplace (not shown) and interface with purchase and delivery services of the electronic marketplace. In this manner, the aerial vehicle management system 302 may coordinate delivery of items via UAVs, such as the UAV 102, to customers of the electronic marketplace. In some examples, the aerial vehicle management system 302 may determine one or more landing locations for landing UAVs. In some examples, the aerial vehicle management system 302 may be a stand-alone service operated on its own.

In either example, the aerial vehicle management system 302 may be in communication with the UAV 102 and the controller 106(2) via one or more network(s) 306 (hereinafter, "the network 306"). The network 306 may include any one or a combination of many different types of networks, such as cable networks, the Internet, wireless networks, cellular networks, radio networks, and other private and/or public networks. Thus, the aerial vehicle management system 302 may be configured to provide back-end control of the UAV 102 prior to, during, and after completion of its mission. In some examples, the UAV 102 may be configured to accomplish its mission (e.g., deliver its payload to a customer) with little to no communication with the aerial vehicle management system 302.

Turning now to the details of the UAV 102, the UAV 102 may include the UAV management device 112 including at least one memory 314 and one or more processing units (or processor(s)) 316. The processor(s) 316 may be implemented as appropriate in hardware, computer-executable instructions, software, firmware, or combinations thereof. Computer-executable instruction, software, or firmware implementations of the processor(s) 316 may include computer-executable or machine-executable instructions written in any suitable programming language to perform the various functions described. The memory 314 may include more than one memory and may be distributed throughout the UAV management device 112 and/or the aerial vehicle management system 302. The memory 314 may store program instructions (e.g., a UAV management engine 304(a)) that are loadable and executable on the processor(s) 316, as well as data generated during the execution of these programs. Depending on the configuration and type of memory including the UAV management engine 304(a), the memory 314 may be volatile (such as random access memory (RAM)) and/or non-volatile (such as read-only memory (ROM), flash memory, or other memory). The UAV management device 112 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. The memory 314 may include an operating system 320 and one or more application programs, modules, or services for implementing the features disclosed herein including at least the UAV management engine 304.

In some examples, the UAV management device 112 may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the UAV management engine 304. The modules of the UAV management engine 302(a) may include one or more components, modules, and the like. The UAV management device 112 may also include input/output (I/O) device(s) and/or ports 324, such as for enabling connection with a keyboard, a mouse, a pen, a voice input device, a touch input device, a display, speakers, a printer, or other I/O device. The I/O device(s) 324 may enable communication with the other systems of the UAV 102 (e.g., other parts of the management system, power system, communication system, navigation system, propulsion system, and the retaining system).

The UAV management device 112 may also include a data store 326. The data store 326 may include one or more databases, data structures, or the like for storing and/or retaining information associated with implementation of the techniques described herein. In some examples, the data store 326 may include databases, such as a customer information database 328 and a location information database 352. The customer information database 328 may be used to retain information pertaining to customers of an electronic marketplace associated with the aerial vehicle management system 302. Such information may include, for example, delivery address information, customer account information (e.g., electronic profiles for individual users), demographic information for customers, payment instrument information for customers (e.g., credit card, debit cards, bank account information, and other similar payment processing instruments), account preferences for customers, shipping preferences for customers, purchase history of customers, and other similar information pertaining to a particular customer and sets of customers, of the electronic marketplace. In some examples, the customer information database 328 may include any suitable customer information that may be used by the UAV 102 in implementing and/or affecting its flight plan.

The location information database 352 may be used to retain information pertaining to locations determined in accordance with techniques described herein. Such information may be at least partially generated by the aerial vehicle management system 302 and/or the UAV management device 112. The location information database 352 may include information about safe locations where the UAV 102 may land in the event of an emergency. The location information database 352 may also include delivery locations corresponding to the customers in the customer information database 328. The information in the location information database 352 may be updated periodically, in response to certain events, and the like. For example, as the UAV 102 flies over a geographic region it may collect images of the region which can be used to determine possible safety locations. These are locations where the UAV 102 can safely land in the event of an emergency or in the event of a change to the safety mode 116. In some examples, the safety locations are added to the location information database 352 as soon as they are determined. These safety locations may also be shared with the aerial vehicle management system 302, which may save the safety locations in a connection with a similar location information database 350 in the data store 346. In some examples, safety locations are sent to the UAV 102 from the aerial vehicle management system 302 and saved into the location information database 352. For example, at least some safety locations may be precomputed and saved in the database 350. When appropriate (e.g., as the UAV 102 approaches certain geographic locations), the relevant safety locations may be shared with the UAV 102 and saved in the location information database 352. Later batches of relevant safety locations may replace those in the location information database 352 that are no longer relevant (e.g., outside a threshold distance from the current location of the UAV 102). These safety locations may be sent with the heartbeat signals 122.

Turning now to the aerial vehicle management system 302, the aerial vehicle management system 302 may include one or more service provider computers, perhaps arranged in a cluster of servers or as a server farm. In some examples, the aerial vehicle management system 302 may include one or more virtual computers. The aerial vehicle management system 302 may include at least one memory 332 and one or more processing units (or processor(s)) 334. The processor(s) 334 may be implemented as appropriate in hardware, computer-executable instructions, software, firmware, or combinations thereof. Computer-executable instructions, software or firmware implementations of the processor(s) 334 may include computer-executable or machine-executable instructions written in any suitable programming language to perform the various functions described. The memory 332 may include more than one memory and may be distributed throughout the aerial vehicle management system 302. The memory 332 may store program instructions (e.g., the UAV management engine 304($b$)) that are loadable and executable on the processor(s) 334, as well as data generated during the execution of these programs. The memory 332 may be volatile (such as random access memory (RAM)) and/or non-volatile (such as read-only memory (ROM), flash memory, or other memory).

The aerial vehicle management system 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM. The memory 332 may also include an operating system 338 and one or more application programs, modules or services for implementing the techniques described herein including at least the UAV management device 112($b$). The UAV management engine 304 ($b$), in some examples, may function similar to the UAV management engine 304($a$). For example, when the UAV 102 is in network communication with the aerial vehicle management system 302, the UAV 102 may receive at least some instructions from the aerial vehicle management system 302 as the UAV management engine 304($b$) is executed by the processors 334. In some examples, the UAV 102 executes the UAV management engine 304($a$) independent of the aerial vehicle management system 302.

In some examples, the aerial vehicle management system 302 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the aerial vehicle management system 302. The aerial vehicle management system 302 may also include input/output (I/O) device(s) and/or ports 342, such as for enabling connection with a keyboard, a mouse, a pen, a voice input device, a touch input device, a display, speakers, a printer, or other I/O device.

In some examples, the aerial vehicle management system 302 may include a user interface 344. The user interface 344 may be utilized by an operator, or other authorized user to access portions of the aerial vehicle management system 302. In some examples, the user interface 344 may include a graphical user interface, web-based applications, programmatic interfaces such as application programming interfaces (APIs), or other user interface configurations.

For example, the user interface 344 may enable an operator to remotely control the UAV 102. The aerial vehicle management system 302 may also include data store 346. The data store 346 may include one or more databases, data structures, or the like for storing and/or retaining information associated with the aerial vehicle management system 302. The data store 346 may include databases, such as a customer information database 348 and the location information database 350. The customer information database 348 and the location information database 350 may include similar information as the customer information database 328 and the location information database 352. In some examples, the aerial vehicle management system 302 may store a larger amount of information in the data store 346 than the UAV management device 112 is capable of storing in the data store 326. Thus, in some examples, at least a portion of the information from the databases in the data store 346 is copied to the databases of the data store 326, e.g., periodically, occasionally, in connection with an event, or otherwise. In this manner, the data store 326 may have up-to-date information, without having to maintain the databases. In some examples, this information may be transferred as part of a flight plan prior to the UAV 102 beginning the flight plan, on an as-needed basis, in connection with the heartbeat signals 122, and in any other suitable manner.

Figure 4:
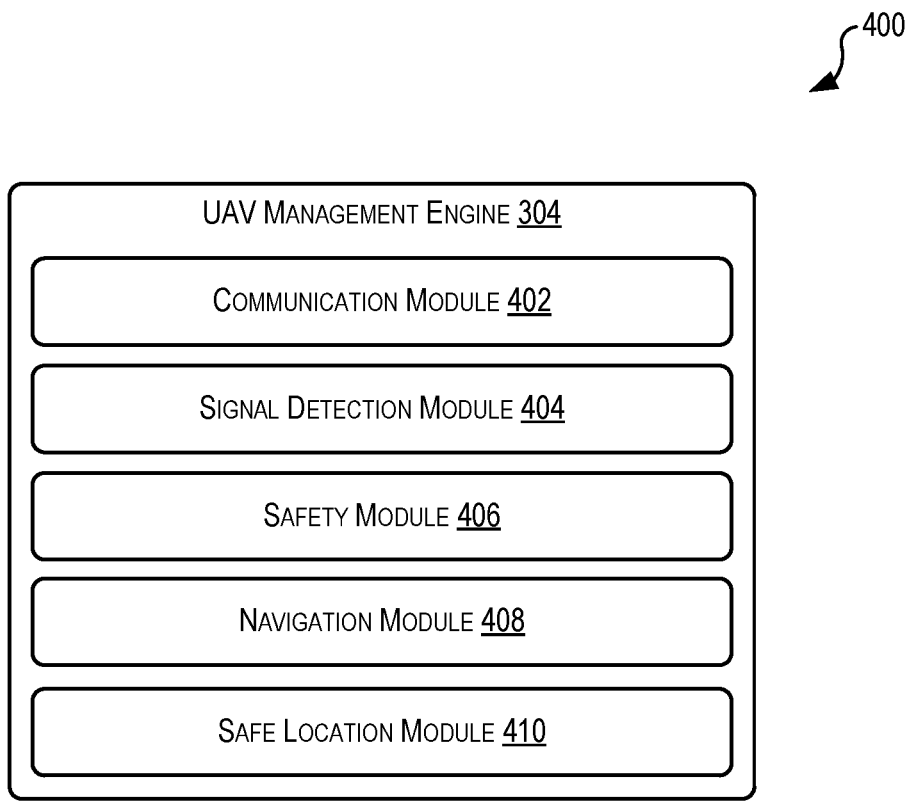
FIG. 4 is an example device for implementing techniques relating to detecting and recovering from hostile takeovers of UAVs as described herein, according to at least one example.

FIG. 4 illustrates an example device 400 including the UAV management engine 304. The UAV management engine 304 may be configured to manage one or more sub-modules, components, engines, and/or services directed to examples disclosed herein. In some examples, the UAV management engine 304 may include a communication module 402, a signal detection module 404, a safety module 406, a navigation module 408, and a safe location module 410. While these modules are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other modules, components, engines, and/or services may perform the same tasks as the UAV management engine 304 or other tasks. Each module, component, or engine may be implemented in software, firmware, hardware, and in any other suitable manner.

The communication module 402 may be configured to communicate with the aerial vehicle management system 302, the controllers 106, and other UAVs 102. This can include, for example, receiving control signals, receiving heartbeat signals, sending response signals, and performing any other suitable communication technique. The signal detection module 404 may be configured to detect signals received by and transmitted by the communication module 402. For example, the signal detection module 404 may detect when a heart signal is received by the communication module 402. The signal detection module 404 may include functionality similar to a watchdog timer. Receiving the signals may function to reset the timer. When a signal is not received within a time window provided by the timer (or when any other condition is not met), the signal detection module 402 may cause the safety module 406 to be invoked. The safety module 406 may be configured to cause the UAV 102 to perform one or more safety actions. These safety actions may function to reset aspects of the UAV 102 and/or cause the UAV 102 to navigate to a safe location for landing. The safety actions may include performing an authentication technique as described herein. The navigation module 408 may be configured to navigate the UAV 102 to safe locations and at other times while the UAV 102 fulfills its mission. For example, the navigation module 408 may determine a navigation plan to fulfill delivery of an item to a customer. The safe location module 410 may be used to generate and select a safe location for the UAV 102. For example, the safe location module 410 may access one or more images taken by the UAV 102 of a geographic region around the UAV 102. The safe location module 410 may use the images to compute safe locations for the UAV 102 to land in case of an emergency. Computing the safe locations may take into account the geography, buildings, people present, likelihood of people being present, public or private access, and any other suitable factor associated with the region.

Figure 5:
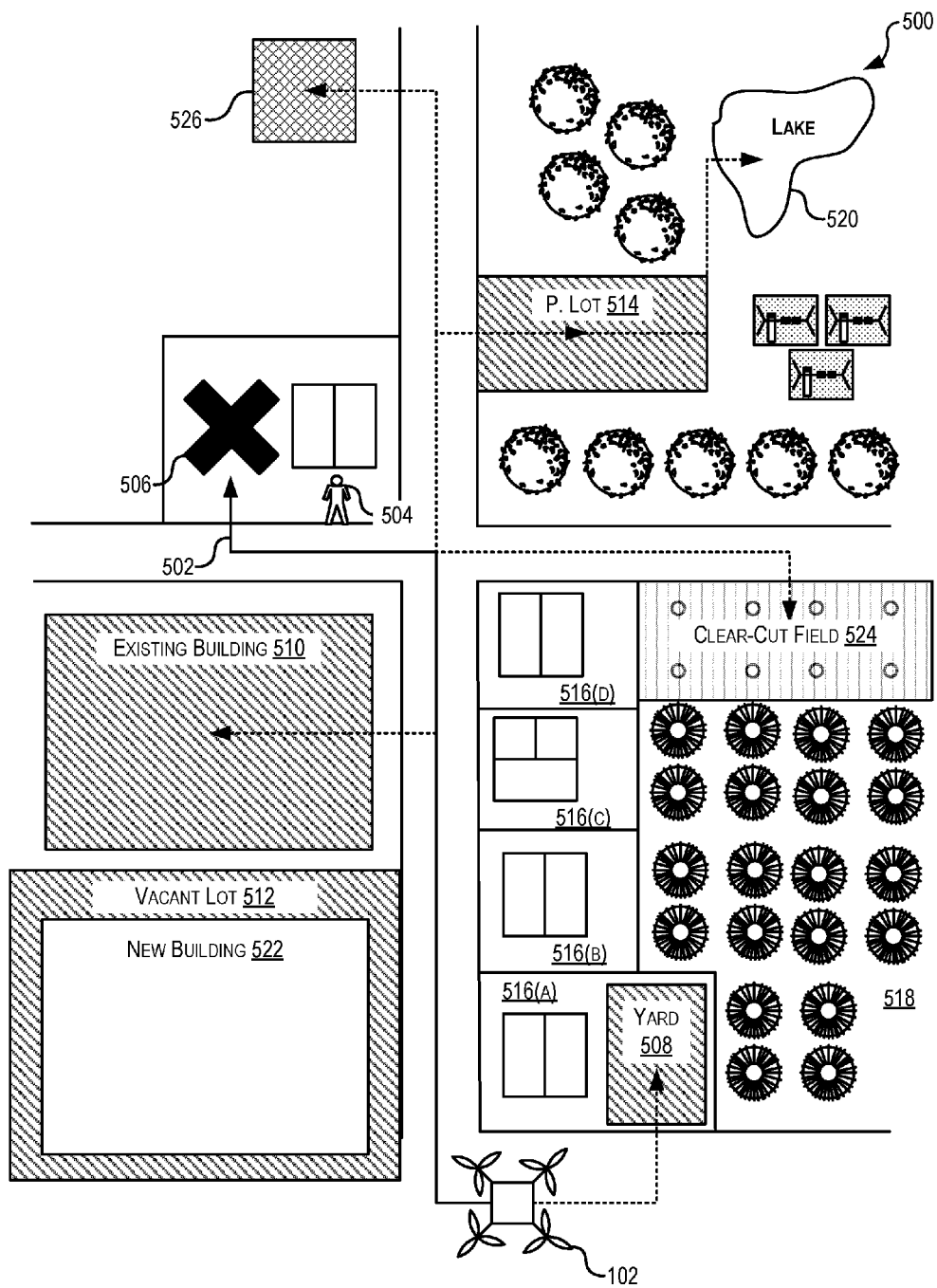
FIG. 5 is an example environment for implementing techniques relating to detecting and recovering from hostile takeovers of UAVs as described herein, according to at least one example.

FIG. 5 illustrates an example environment 500 for implementing techniques relating to detecting and recovering from hostile takeovers of UAVs, according to at least one example. In particular, the environment 500 is used to illustrates multiple embodiments in which the UAV 102 can determine safe locations. The environment 500 is a neighborhood over which the UAV 102 flies according to an expected flight path 502 (illustrated as a solid line) to deliver its payload to a customer 504 at a delivery location 506. While the UAV 102 navigates along the expected flight path 502, the UAV 102 may be in the mission mode. The navigation module 408 may be used to navigate the UAV 102.

In some examples, prior to the UAV 102 navigating along the expected flight path 502, the environment 500 may have been previously analyzed to identify possible safe locations (e.g., locations where the UAV 102 can land in the case of a hostile takeover). For example, an earlier UAV using any suitable combination of image sensors may have flown over the environment 500 and captured images of the environment 500. These images may have processed by the aerial vehicle management system 302 to identify possible safe locations. In some examples, the possible safe locations may be classified along a scale of suitability, which may consider factors such as surface conditions (e.g., slopes, grass, concrete, trees, buildings, etc.), current presence of humans, likelihood of humans being present, private or public property, accessibility, and any other suitable factor. Each property parcel and/or safe location within a property parcel may be classified. These classifications along with geographic information (e.g., geographic coordinates) identifying the safe location and other identifies may be stored in a database such as the location information database 350.

In some examples, prior to the UAV 102 navigating along the expected flight path 502, the UAV 102 may be provided the list of the safe locations adjacent the expected flight path 502 determined by the aerial vehicle management system. This may be performed as part of providing the UAV 102 its mission plan. For example, the UAV 102 may be provided a list that identifies yard 508, existing building 510, vacant lot 512, and parking lot 514 as possible safe locations. In some examples, the list may also identify lots 516(a)-516(d), forest 518, and lake 520 as other possible safe locations. When the UAV 102 switches to safety mode as a result of a hostile takeover attempt or otherwise as described herein, it may select a possible landing location from the existing list based on the classifications of these possible safe locations, with the yard 508, the existing building 510, the vacant lot 512, and the parking lot 514 being more desirable than the other possible locations (e.g., the lots 516 (b)-(c), the forest 518, and the lake 520). The safe location module 410 may be configured to manage and determine these and other possible safe locations.

In some examples, the safe locations may be provided to the UAV 102 as part of the heartbeat signals 122. For example, each heartbeat signal 122 may include a portion of the list of possible safe locations that are within a threshold distance of the current location of the UAV 102 along the path 502. In some examples, the UAV 102 may be provided safe location identifiers in the heartbeat signals 122. The UAV 102 can then use the safe location identifies to identify appropriate safe locations from the location information database 352. In some examples, instead of or in addition to receiving the safe location identifiers, the UAV 102 may be provided geographic information that identifies the safe locations in the list. The UAV 102 may use the geographic information to navigate to the safe locations, in some cases, without accessing the location information database 352.

The UAV 102 may select an appropriate safe location based at least in part on one or more selection factors. Examples of selection factors can include, for example, a proximity factor (e.g., distance of the safe location from a current location of the UAV 102), a classification factor (e.g., a classification of the safe location in terms of landing suitability), a potential damage factor (e.g., potentiality for damage to the UAV 102 or property), and any other suitable factor.

In some examples, the conditions in the environment 500 may have changed between when the list of possible safe locations was originally compiled (e.g., prior to the UAV 102 navigating along the expected flight path 502). Because of this, the UAV 102 may be configured to dynamically determine possible safe locations, which may be different than those previously determined. For example, the UAV 102 may identify that a new building 522 has been built on the vacant lot 512. The UAV 102 may evaluate in real-time (e.g., as it visually detects the area) whether the new building 522 can be considered a possible safe location. Similarly, the UAV 102 may identify that a portion of the forest 518 has been cut down to create a clear-cut field 524. The UAV 102 may evaluate in real-time whether the clear-cut field 524 can be considered a possible safe location. The UAV 102 may share any changes to the environment 500 with the aerial vehicle management system 302 or other comparable system in order to update a master list of possible safe locations.

The environment 500 also includes authentication location 526. Authentication locations similar to the authentication location 526 may be scattered about areas where UAVs 102 fly. The authentication location 526 may be a location where the UAV 102 may be able to reset certain aspects of its operation without having to land at one of the possible safe locations. For example, as described in more detail with respect to FIGS. 6 and 7, the UAV 102 may navigate to the authentication location 526 when in the safety mode. At the authentication location 526, the UAV 102 may process information, share information, and otherwise interact with components at the authentication location 526. Such information may be transmitted by and between the UAV 102 and the authentication location 526 using any suitable medium (e.g., projected light, sounds waves, radio-frequency signals, and any other suitable medium). The interactions performed at the authentication location 526 may enable the UAV 102 to switch back to mission mode and continue on the expected flight path 502. In some examples, the interactions may enable the UAV 102 to alter certain control signal characteristics (e.g., channel, signal processing, communication scheme, signal intervals, etc.) of the control signals, the heartbeat signals, and any other signals to avoid future takeover attempts.

Figure 6:
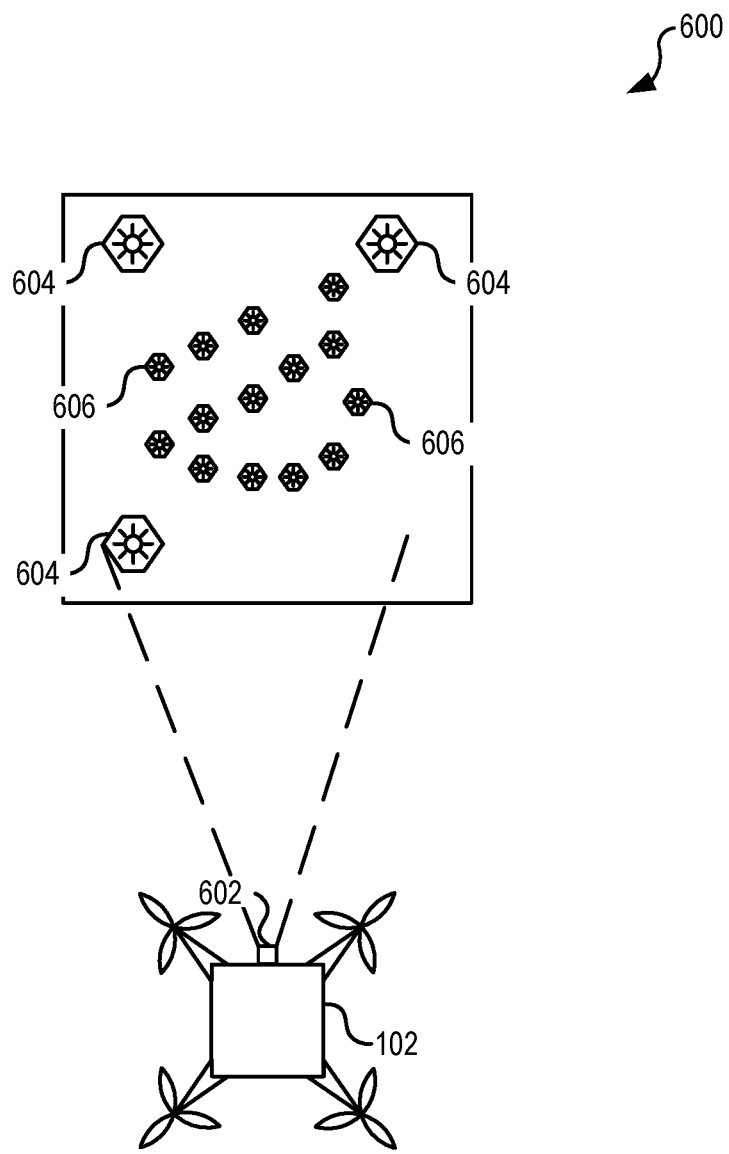
FIG. 6 is an example authentication location for implementing techniques relating to detecting and recovering from hostile takeovers of UAVs as described herein, according to at least one example.

FIG. 6 illustrates an example authentication location 600 for implementing techniques relating to detecting and recovering from hostile takeovers of UAVs, according to at least one example. The authentication location 600 is an example of the authentication location 526 including light information that is spatially arranged. To this end, the authentication location 600 may be configured to interact with the UAV 102. In this example, the UAV 102 may be outfitted with an image capture device or other light sensor 602. The light sensor 602 may be configured to detect encoded information from a particular pattern of lights projected from the authentication location 600. For example, the authentication location 600, like a QR code or other encoded module, may include a first set of lights 604 for position and orientation detection and a second set of lights 606 for encoding information. Depending on the implementation, the first set of lights 604 and the second set of lights 606 may be more complex or less complex than shown. In some examples, the first set of lights 604 may function as self-clocking lights to appropriately orientate the pattern created by the second set of lights 606. The UAV 102 may use the light sensor 602 to scan the pattern formed by the first and second set of lights 604, 606. Recognition of the pattern by the UAV 102 may cause a change in the UAV 102. For example, the UAV 102 may reset from a safety mode to a mission mode. The UAV 102 may adjust characteristics of control signals used to control the UAV 102. These adjustments can be coordinated with the controller 106 used to control the UAV 102. For example, if the UAV 102 changes the frequency of its control channel, the updated frequency can be also be provided to the controller 106. This may be performed by any suitable computing device that manages the lights 604, 606 at the authentication location 600. In some examples, the light emitted by the lights 604, 606 may have any suitable characteristic along the electromagnetic spectrum (e.g., visible, infrared, ultra violet, etc.). In some examples, the light sensor 602 may be located at the authentication location 600 and the UAV 102 may include a set of lights that are used for authentication similar to the lights 604, 606.

Figure 7:
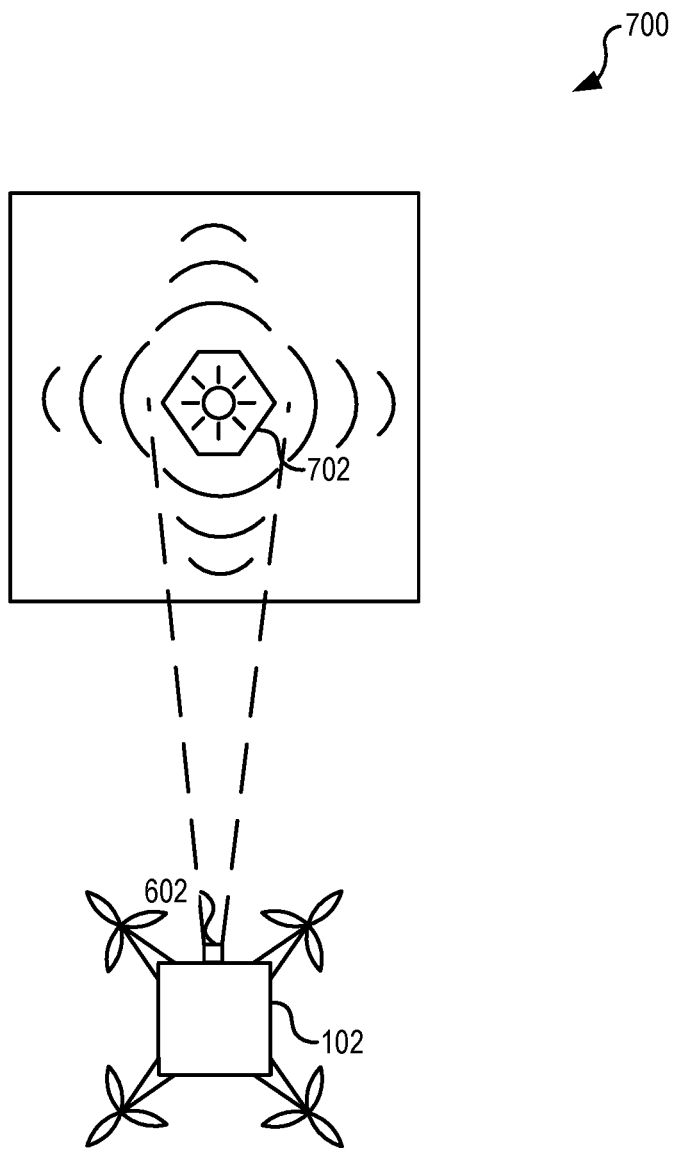
FIG. 7 is an example authentication location for implementing techniques relating to detecting and recovering from hostile takeovers of UAVs as described herein, according to at least one example.

FIG. 7 illustrates an example authentication location 700 for implementing techniques relating to detecting and recovering from hostile takeovers of UAVs, according to at least one example. The authentication location 700 is an example of the authentication location 526 including light information that is temporally modulated. To this end, the authentication location 700 may be configured to interact with the UAV 102. In this example, the UAV 102 includes the light sensor 602. The light sensor 602 may be configured to detect encoded information from a temporal modulation of light from one or more lights 702. The light 702 may be configured to flash or otherwise change its brightness characteristics. The light sensor 602 may detect these changes which can be processed by the UAV 102 to re-authenticate the UAV 102 as described herein.

Figure 8:
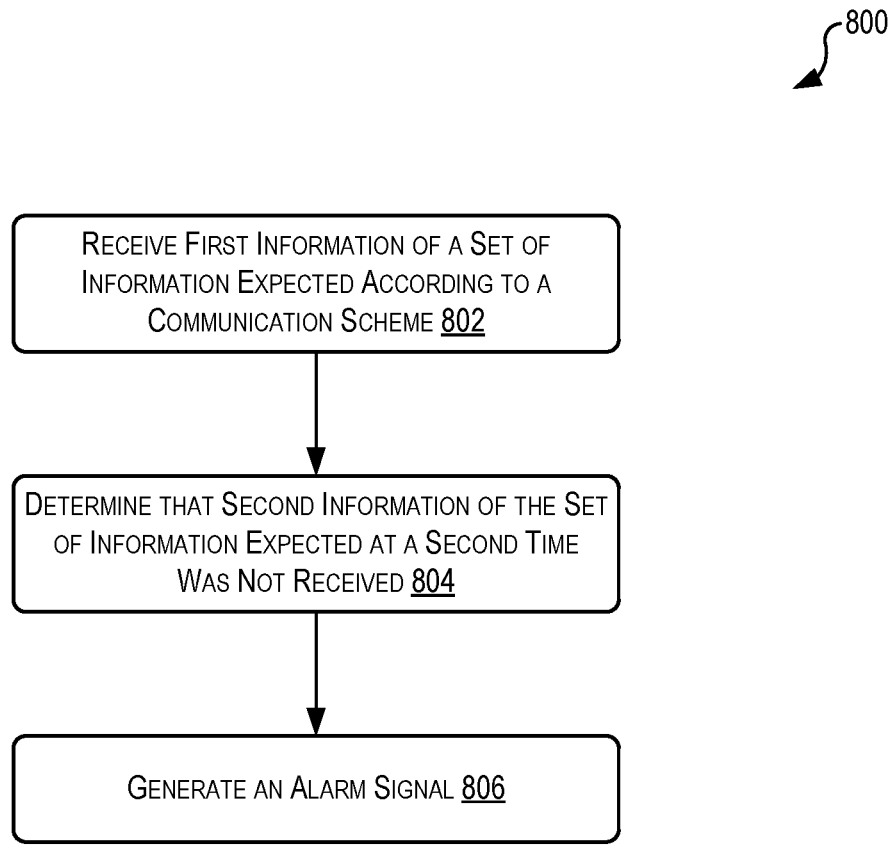
FIG. 8 is a flow diagram depicting example acts for implementing techniques relating to detecting and recovering from hostile takeovers of UAVs as described herein, according to at least one example.
Figure 9:
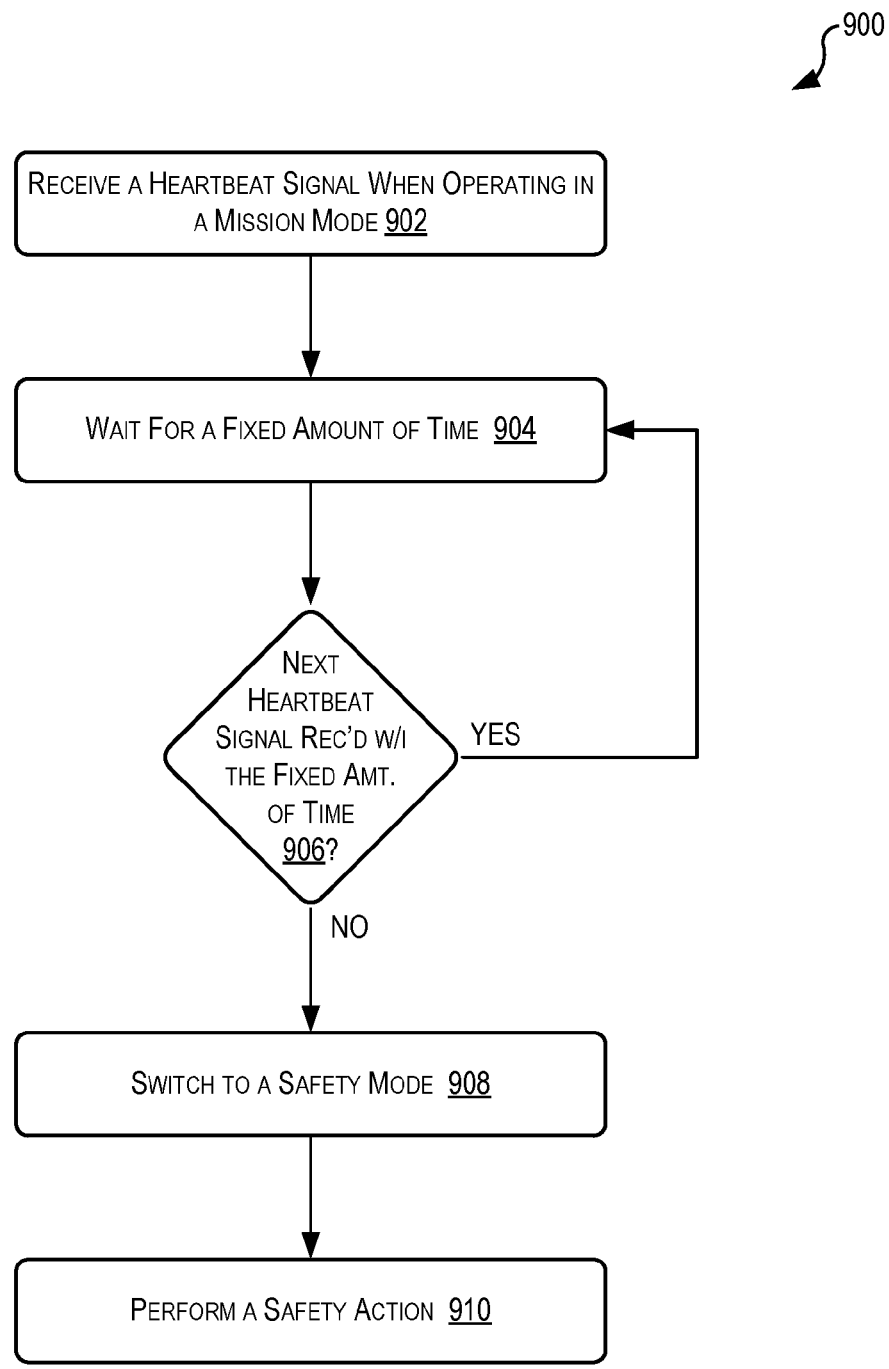
FIG. 9 is a flow diagram depicting example acts for implementing techniques relating to detecting and recovering from hostile takeovers of UAVs as described herein, according to at least one example.

FIGS. 8 and 9 illustrate example flow diagrams showing respective processes 800 and 900, as described herein. These processes 800 and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 8 depicts the process 800 including example acts or techniques relating to detecting and recovering from hostile takeovers of UAVs, in accordance with at least one example. The UAV management engine 304 (FIG. 3) may perform the process 800 of FIG. 8. The process 800 begins at 802 by receiving first information of a set of information expected according to a communication scheme. In some examples, this may be performed by the communication module 402 (FIG. 4). In some examples, the first information may be received at an aerial device at a first time. For example, the first information may be received as a first part of a signal received at the aerial device. The first information may also be received as a first signal received at the aerial device. The communication scheme may indicate that the set of information be received according to any suitable interval and/or scheme. The set of information may be received from a device included on the aerial device and configured to output the set of information according to the communication scheme. For example, a portion of a management device of the aerial device may be configured to output the set of information. In this manner, the set of information may be detected within the management device or other device under the control of the management device. This may operate as a process that is separate from other processes that are running on the management device relating to navigation, propulsion, etc. In some examples, interruption of the other processes (e.g., as a result of takeover attempt) may also affect the set of information, either in its generation or its receiving by the device or the management device. In some examples, the set of information may be transmitted from a controller such as a manual control device or an aerial device management system. The controller may be remote from the aerial device. In this manner, the set of information may be transferred over the air.

At 804, the process 800 determines that second information of the set of information expected at a second time was not received. This may be performed by the signal detection module 404 (FIG. 4). The determining at 804 may be based at least in part on the communication scheme. The second time may occur after the first time. In some examples, the process 800 also includes, after receiving the first information, setting a timer for a period of time. In this example, determining that the second information expected at the second time was not received may include determining that the second information was not received within the period of time. The second information may be received as a first part of a signal received at the aerial device. The second information may also be received as a second signal received at the aerial device.

At 806, the process 800 generates an alarm signal. This may be performed by the safety module 406 (FIG. 4). Generating the alarm signal may be in response to determining that the second signal was not received. In some examples, the alarm signal causes the aerial device to perform a safety action that includes at least one of: hovering for a period of time corresponding to the communication scheme to receive third information of the set of information expected at a third time occurring after the second time, sending a reconnection signal to a controller, changing a communication scheme including the communication scheme and according to which the set of information is expected, changing a channel on which control signals are received from the controller, navigation of the aerial device to a predefined safe location, determination by the aerial device of a safe location and navigation of the aerial device to the safe location, navigation of the aerial device to a home location (e.g., a geographic location of a home base or other known geographic location), or navigation of the aerial device to an authentication location. In some examples, the alarm signal causes an error state in the aerial device. The process 800 may also include at least in response to generating the alarm signal, causing the aerial device to the navigate an authentication location. The process 800 may also include causing the aerial device to perform an authentication technique while at the authentication location, successful performance of the authentication technique may reset the error state in the aerial device and cause a change to at least one signal characteristic of control signals that control the aerial device. In some examples, the authentication technique may include detecting, by the aerial device and using an imaging device on the aerial device, light information projected from the authentication location. The light information may be spatially arranged and/or temporally modulated. In some examples, the at least one signal characteristic may include a channel, an encryption technique, or a transmission rate. In some examples, the process 800 may also include receiving a set of control signals from a controller, the set of control signals may include at least one signal capable of controlling a propulsion device of the aerial device. The set of control signals may, in some examples, include the set of information (e.g., a first control signal may include the first information and a second control signal may include the second information). For example, the control signals may be multiplexed to include the first information and the second information.

FIG. 9 depicts the process 900 including example acts or techniques relating to detecting and recovering from hostile takeovers of UAVs, in accordance with at least one example. The UAV management engine 304 (FIG. 3) may perform the process 900 of FIG. 9. The process 900 begins at 902 by receiving a heartbeat signal when operating in a mission mode. This may be performed by the communication module 402 (FIG. 4) operating on the UAV 102.

At 904, the process 900 waits for a fixed amount of time. This may be performed by the signal detection module 404 (FIG. 4). Waiting for the fixed amount of time may include resetting a timer after the heartbeat signal is received. The fixed amount of time may be any suitable amount of time including milliseconds, seconds, minutes, etc. While waiting, the signal detection module 404 may be waiting for another heartbeat signal to be received by the communication module 402.

At 906, the process 900 determines whether a next heartbeat signal has been received within the fixed amount of time. This may be performed by the signal detection module 404. If YES, the process 900 returns to 904 and waits for the fixed amount of time. If NO, the process 900 continues to 908 where the process 900 switches to a safety mode. This may be performed by the safety module 406 (FIG. 4). Switching to the safety mode may be performed to limit the controllability of the UAV 102 by a nefarious operator or other system. In the safety mode, the UAV 102 may revert to a set of predefined actions designed to avoid damage or loss as a result of the nefarious operator's actions.

At 910, the process 900 performs a safety action. The safety action may include any suitable action that enables the UAV 102 to avoid the hostile takeover. For example, the safety action may include at least one of: hovering for a period of time corresponding to the time interval to receive a third signal of the set of signals expected at a third time occurring after the second time, sending a reconnection signal to a controller, changing a channel on which control signals are received from the controller, navigation of the aerial device to a predefined safe location, determination by the aerial device of a safe location and navigation of the aerial device to the safe location, navigation of the aerial device to a home location, or navigation of the aerial device to an authentication location.

Figure 10:
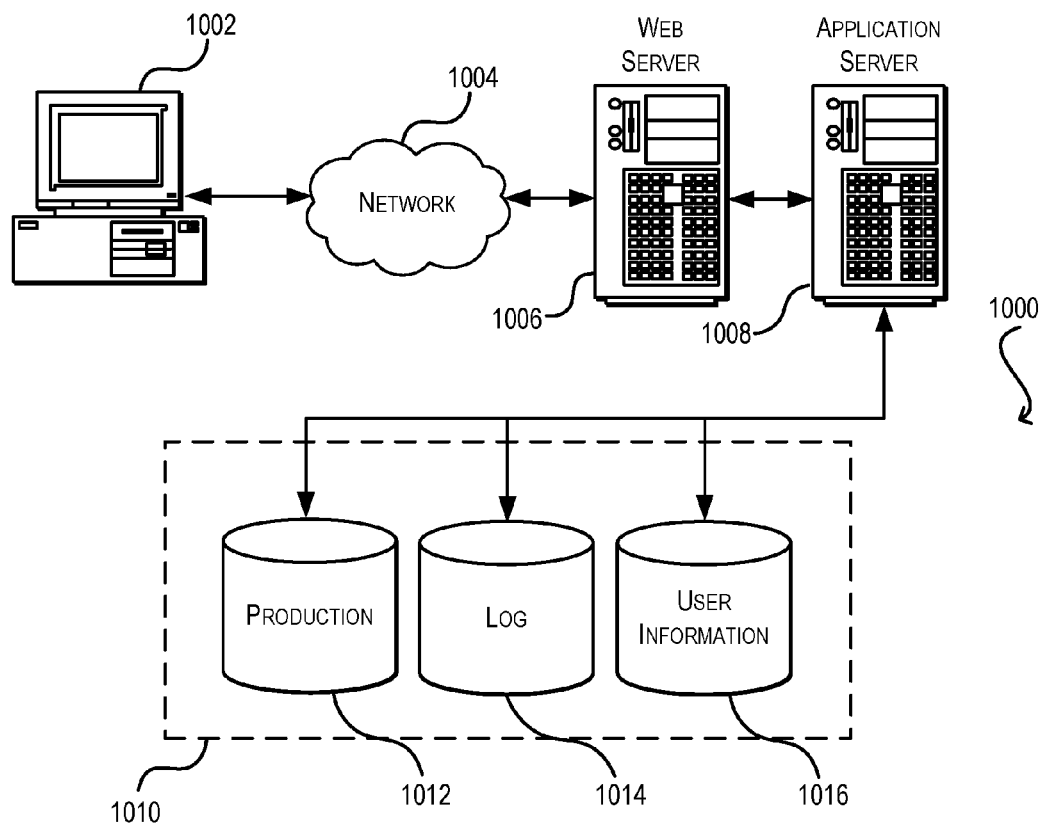
FIG. 10 is an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
   a frame;
   a propulsion device attached to the frame; and
   a management device in communication with the propulsion device and configured to:
   receive a control signal from a controller, the control signal at least comprising a signal capable of controlling the propulsion device;
   receive a first heartbeat signal, the first heartbeat signal and subsequent heartbeat signals expected to be received by the management device according to a fixed interval;
   detect that a second heartbeat signal was not received by the management device according to the fixed interval; and
   at least in response to the detecting, initiate a safety protocol comprising instructions for the management device to perform one or more safety actions.

2. The UAV of claim 1, wherein the management device is further configured to, in response to receiving the first heartbeat signal, send a first response signal to the controller, the second heartbeat signal provided by the controller in response to receiving the first response signal.

3. The UAV of claim 1, wherein receiving the first heartbeat signal comprises receiving the first heartbeat signal from the controller or receiving the first heart beat signal from a device included on the UAV and managed by the management device.

4. The UAV of claim 1, wherein the one or more safety actions comprise at least one of autonomous navigation of the UAV to a safe location, autonomous navigation of the UAV to an authentication location, or autonomous hovering of the UAV for a certain period of time.

5. A computer-implemented method, comprising:
   receiving, at an aerial device and at a first time, first information of a set of information expected according to a communication scheme;
   determining, based at least in part on the communication scheme, that second information of the set of information expected at a second time was not received, the second time occurring after the first time; and
   in response to determining that the second information was not received, generating an alarm signal.

6. The computer-implemented method of claim 5, further comprising receiving a set of control signals from a controller, the set of control signals comprising at least one signal capable of controlling a propulsion device of the aerial device.

7. The computer-implemented method of claim 5, wherein:
   the method further comprises, after receiving the first information, setting a timer for a period of time; and
   determining that the second information expected at the second time was not received comprises determining that the second information was not received within the period of time.

8. The computer-implemented method of claim 5, wherein the alarm signal causes the aerial device to perform a safety action comprising at least one of:
   hovering for a period of time corresponding to the communication scheme to receive third information of the set of information expected at a third time occurring after the second time;
   sending a reconnection signal to a controller;
   changing the communication scheme according to which the set of information is expected;
   changing a channel on which control signals are received from the controller;
   navigation of the aerial device to a predefined safe location;
   determination by the aerial device of a safe location and navigation of the aerial device to the safe location;
   navigation of the aerial device to a home location; or
   navigation of the aerial device to an authentication location.

9. The computer-implemented method of claim 5, wherein:
   the alarm signal causes an error state in the aerial device; and
   the method further comprises:
   at least in response to generating the alarm signal, causing the aerial device to navigate to an authentication location; and
   causing the aerial device to perform an authentication technique while at the authentication location, successful performance of the authentication technique resetting the error state in the aerial device and causing a change to at least one signal characteristic of control signals that control the aerial device.

10. The computer-implemented method of claim 9, wherein the authentication technique comprises detecting, by the aerial device and using an imaging device on the aerial device, light information projected from the authentication location.

11. The computer-implemented method of claim 10, wherein the light information is spatially arranged or temporally modulated.

12. The computer-implemented method of claim 9, wherein the at least one signal characteristic comprises a channel, an encryption technique, or a transmission rate.

13. The computer-implemented method of claim 5, wherein the set of information is:
   received from a device included on the aerial device and configured to output the set of information according to the communication scheme; or
   transmitted from a controller comprising at least one of a manual control device or an aerial device management system.

14. The computer-implemented method of claim 5, wherein the set of information comprises a set of signals transmitted to the aerial device as a continuous transmission.

15. A computer-implemented method, comprising:
   receiving, at an aerial device, a first heartbeat signal from a controller, the first heartbeat signal comprising information about a safe location; and
   in the event a second heartbeat signal is not received from the controller within a predetermined time after receiving the first beat signal, causing the aerial device to navigate to the safe location.

16. The computer-implemented method of claim 15, wherein the information about the safe location comprises at least one of an identifier usable by the aerial device to access geographic information about the safe location from a database associated with the aerial device or a geographic identifier that identifies a geographic location corresponding to the safe location.

17. The computer-implemented method of claim 15, wherein:
   the information comprises other information about other safe locations; and
   the method further comprises, prior to causing the aerial device to navigate to the safe location, selecting the safe location from among a set of safe locations comprising the safe location and the other safe locations.

18. The computer-implemented method of claim 17, wherein selecting the safe location is based at least in part on a selection factor comprising at least one of:
   a proximity factor indicating a proximity of individual safe locations of the set of safe locations to a current location of the aerial device; or
   a classification factor indicating a landing class of the individual safe locations of the set of safe locations.

19. The computer-implemented method of claim 15, wherein:
   the safe location is a first safe location; and
   the method further comprises, prior to receiving the first heartbeat signal from the controller, receiving a third heartbeat signal from the controller, the third heartbeat signal comprising information about a third safe location.

20. The computer-implemented method of claim 15, wherein:
   the method further comprises receiving a set of control signals from the controller, the set of control signals comprising at least one signal capable of controlling a propulsion device of the aerial device; and
   causing the aerial device to navigate to the safe location comprises controlling the propulsion device without use of control signals of the set of control signals.

* * * * *